(12) United States Patent
Takeuchi

(10) Patent No.: US 11,421,629 B2
(45) Date of Patent: Aug. 23, 2022

(54) REFORMING SYSTEM AND ENGINE SYSTEM

(71) Applicant: KABUSHIKI KAISHA TOYOTA JIDOSHOKKI, Kariya (JP)

(72) Inventor: Yoshitaka Takeuchi, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 17/601,600

(22) PCT Filed: Dec. 23, 2019

(86) PCT No.: PCT/JP2019/050272
§ 371 (c)(1),
(2) Date: Oct. 5, 2021

(87) PCT Pub. No.: WO2020/208876
PCT Pub. Date: Oct. 15, 2020

(65) Prior Publication Data
US 2022/0170433 A1 Jun. 2, 2022

(30) Foreign Application Priority Data

Apr. 11, 2019 (JP) .............................. JP2019-075853

(51) Int. Cl.
*F02M 21/00* (2006.01)
*F02M 21/02* (2006.01)
*F02M 21/06* (2006.01)

(52) U.S. Cl.
CPC .... *F02M 21/0227* (2013.01); *F02M 21/0206* (2013.01); *F02M 21/06* (2013.01)

(58) Field of Classification Search
CPC . F02M 21/0227; F02M 21/0206; F02M 21/06
See application file for complete search history.

(56) References Cited

U.S. PATENT DOCUMENTS 3,671,422 A * 6/1972 Morrow ................. C10G 11/18
568/759
5,343,699 A * 9/1994 McAlister .............. F02M 27/02
123/3

(Continued)

FOREIGN PATENT DOCUMENTS

JP 2005-521849 A 7/2005
JP 2005-226665 A 8/2005

(Continued)

*Primary Examiner* — Sizo B Vilakazi
*Assistant Examiner* — Sherman D Manley
(74) *Attorney, Agent, or Firm* — Sughrue Mion, PLLC

(57) ABSTRACT

A reforming system includes a vaporizer configured to vaporize liquid fuel to produce fuel gas; a reformer configured to reform the fuel gas produced by the vaporizer to produce a reformed gas containing hydrogen; an air supplier configured to supply air to the reformer; a fuel gas supplier configured to supply the fuel gas to the reformer; a heater configured to increase a temperature of the reformer; a reformed gas flow passage through which the reformed gas produced by the reformer flows; a cooler disposed in the reformed gas flow passage and configured to cool the reformed gas; a circulation passage connecting the vaporizer with the cooler and through which refrigerant flows through the vaporizer and the cooler; and a circulation pump disposed in the circulation passage and configured to circulate the refrigerant through the circulation passage.

5 Claims, 3 Drawing Sheets

(56) References Cited

U.S. PATENT DOCUMENTS

| | | | | |
|---|---|---|---|---|
| 6,367,258 | B1* | 4/2002 | Wen | F02C 7/224 |
| | | | | 60/641.1 |
| 8,272,353 | B2* | 9/2012 | Dincer | F02M 21/0227 |
| | | | | 123/3 |
| 9,150,796 | B2* | 10/2015 | Etter | C10G 47/02 |
| 2011/0283960 | A1* | 11/2011 | Hikazudani | C01B 3/047 |
| | | | | 123/3 |
| 2012/0040260 | A1* | 2/2012 | Morita | H01M 8/04044 |
| | | | | 429/414 |
| 2012/0167840 | A1* | 7/2012 | Miyagawa | F02D 19/0671 |
| | | | | 422/111 |
| 2013/0001064 | A1* | 1/2013 | Lourenco | C10G 69/04 |
| | | | | 203/29 |
| 2013/0025547 | A1* | 1/2013 | Nakagawa | F02M 25/12 |
| | | | | 123/3 |
| 2013/0288143 | A1* | 10/2013 | Lee | C25B 1/04 |
| | | | | 429/422 |
| 2014/0069117 | A1* | 3/2014 | Jung | F25J 1/0277 |
| | | | | 62/48.1 |
| 2014/0348714 | A1* | 11/2014 | Segawa | B01J 12/005 |
| | | | | 422/162 |
| 2018/0105418 | A1* | 4/2018 | Zhang | C01B 3/24 |
| 2019/0084831 | A1* | 3/2019 | Andersen | B01J 23/755 |

FOREIGN PATENT DOCUMENTS

| | | |
|---|---|---|
| JP | 2013-029039 A | 2/2013 |
| WO | 2003/085317 A1 | 10/2003 |
| WO | 2012/090739 A1 | 7/2012 |

\* cited by examiner

REFORMING SYSTEM AND ENGINE SYSTEM

CROSS REFERENCE TO RELATED APPLICATION

This application is a National Stage of International Application No. PCT/JP2019/050272 filed Dec. 23, 2019, claiming priority based on Japanese Patent Application No. 2019-075853 filed Apr. 11, 2019, the contents of all of which are incorporated herein by reference in their entirety.

TECHNICAL FIELD

The present invention relates to a reforming system and an engine system.

BACKGROUND ART

As disclosed in Patent Document 1, for example, a reforming system applied to an engine is commonly known. The reforming system disclosed in Patent Document 1 includes a vaporizing device configured to vaporize liquid ammonia stored in a tank, a cracker configured to crack gaseous ammonia, which has been obtained by the vaporizing device, with a catalyst to produce hydrogen, an ammonia supply pipe through which the gaseous ammonia is supplied to the cracker, an air supply pipe through which air is supplied to the cracker, an outlet pipe through which gas containing the hydrogen produced by the cracker is discharged, and a cooling device connected to the outlet pipe and configured to cool the gas at high-temperature discharged from the cracker.

CITATION LIST

Patent Document

Patent Document 1: Domestic re-publication of PCT international publication for patent application No. JPWO2012-090739

SUMMARY OF INVENTION

Technical Problem

However, the above-described prior art has the following problems. That is, for example, if an engine cooling system in which engine cooling water for cooling an engine is circulated includes a pipe connected to the vaporizing device (a vaporizer) and a pipe connected to the cooing device (cooler) to perform heat exchange with the engine cooling water in the vaporizing device and the cooling device, the engine cooling system needs a larger water pump and a significant modification.

An object of the present invention is to provide a reforming system and an engine system that enable effective heat exchange in a vaporizer and a cooler with a simple system configuration.

Solution to Problem

A reforming system according to one aspect of the present invention includes: a vaporizer configured to vaporize liquid fuel to produce fuel gas; a reformer configured to reform the fuel gas produced by the vaporizer to produce a reformed gas containing hydrogen; an air supplier configured to supply air to the reformer; a fuel gas supplier configured to supply the fuel gas to the reformer; a heater configured to increase a temperature of the reformer; a reformed gas flow passage through which the reformed gas produced by the reformer flows; a cooler disposed in the reformed gas flow passage and configured to cool the reformed gas; a circulation passage connecting the vaporizer with the cooler and through which refrigerant flows through the vaporizer and the cooler; and a circulation pump disposed in the circulation passage and configured to circulate the refrigerant through the circulation passage.

In this reforming system, the circulation pump circulates the refrigerant through the circulation passage. The refrigerant at high-temperature is supplied to the vaporizer so that the liquid fuel is vaporized by heat exchange with the refrigerant at high-temperature in the vaporizer, which produces fuel gas and decreases the temperature of the refrigerant. Then, the refrigerant at low-temperature is supplied to the cooler so that the reformed gas is cooled by heat exchange with the refrigerant at low-temperature, which increases the temperature of the refrigerant. Accordingly, the refrigerant at high-temperature is supplied again to the vaporizer. In such a way, this simple system including the circulation passage and the circulation pump enables heat exchange in the vaporizer and the cooler. Further, the vaporizer and the cooler are directly connected via the circulation passage, so that heat exchange in the vaporizer and the cooler can be efficiently performed.

The reforming system may further include a temperature adjuster that is disposed in the circulation passage and configured to adjust a temperature of the refrigerant that flows through the circulation passage. In this configuration, even if the amount of increase in the temperature of the refrigerant in the cooler is different from the amount of decrease in the temperature of the refrigerant in the vaporizer, the refrigerant that flows through the circulation passage can be maintained at a constant temperature by the temperature adjuster.

The temperature adjuster may cool the refrigerant that flows through the circulation passage to adjust the temperature of the refrigerant. In this configuration, even if the amount of increase in the temperature of the refrigerant in the cooler is greater than the amount of decrease in the temperature of the refrigerant in the vaporizer, the refrigerant that flows through the circulation passage can be maintained at a constant temperature by the temperature adjuster.

The temperature adjuster may heat the refrigerant that flows through the circulation passage to adjust the temperature of the refrigerant. In this configuration, even if the amount of decrease in the temperature of the refrigerant in the vaporizer is greater than the amount of increase in the temperature of the refrigerant in the cooler, the refrigerant that flows through the circulation passage can be maintained at a constant temperature by the temperature adjuster.

An engine system according to one aspect of the present invention includes: an engine; an intake gas passage through which air flows to the engine; a vaporizer configured to vaporize liquid fuel to produce fuel gas; a reformer configured to reform the fuel gas produced by the vaporizer to produce a reformed gas containing hydrogen; an air supplier configured to supply air to the reformer; a fuel gas supplier configured to supply the fuel gas to the engine and the reformer; a heater configured to increase a temperature of the reformer; a reformed gas flow passage through which the reformed gas produced by the reformer flows toward the engine; a cooler disposed in the reformed gas flow passage and configured to cool the reformed gas; a circulation passage connecting the vaporizer with the cooler and through which refrigerant flows through the vaporizer and the cooler; and a circulation pump disposed in the circulation passage and configured to circulate the refrigerant through the circulation passage.

In this engine system, the circulation pump circulates the refrigerant through the circulation passage. The refrigerant at high-temperature is supplied to the vaporizer so that the liquid fuel is vaporized by heat exchange with the refrigerant at high-temperature in the vaporizer, which produces fuel gas and decreases the temperature of the refrigerant. Then, the refrigerant at low-temperature is supplied to the cooler so that the reformed gas is cooled by heat exchange with the refrigerant at low-temperature, which increases the temperature of the refrigerant. Accordingly, the refrigerant at high-temperature is supplied again to the vaporizer. In such a way, this simple system including the circulation passage and the circulation pump enables heat exchange in the vaporizer and the cooler. Further, the vaporizer and the cooler are directly connected via the circulation passage, so that heat exchange in the vaporizer and the cooler can be efficiently performed.

Advantageous Effects of Invention

According to the present invention, heat exchange in a vaporizer and a cooler can be efficiently performed with a simple system.

DESCRIPTION OF EMBODIMENTS

Figure 1:
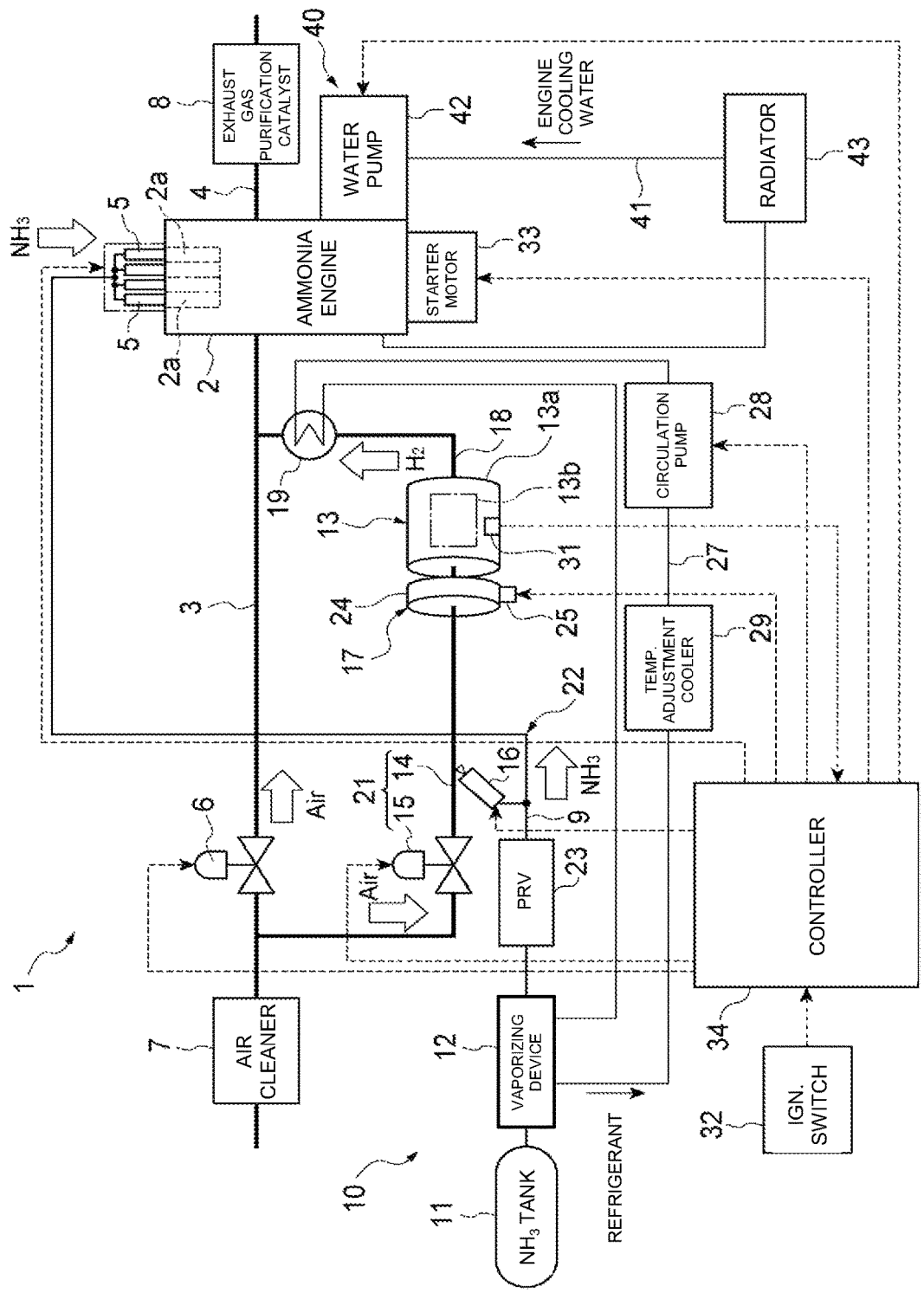
FIG. 1 is a schematic configuration view, illustrating an engine system including a reforming system according to an embodiment of the present invention.

Hereinafter, embodiments of the present invention will be described in detail with reference to the accompanying drawings. It is to be noted that, in the drawings, the same or substantially equal components are designated by the same reference numerals and will not be further elaborated.

FIG. 1 is a schematic configuration view, illustrating an engine system including a reforming system according to an embodiment of the present invention. In FIG. 1, an engine system 1 is mounted on a vehicle. The engine system 1 includes an ammonia engine 2, an intake gas passage 3, an exhaust gas passage 4, a plurality of main injectors 5 (four in this embodiment), and a main throttle valve 6.

The ammonia engine 2 is an engine configured to use ammonia ($NH_3$) as a fuel. The ammonia engine 2 is, for example, a four-cylinder engine and has four combustion chambers 2a. The ammonia engine 2 is supplied with hydrogen ($H_2$) together with ammonia (which will be described later).

The intake gas passage 3 is connected to the combustion chambers 2a. The intake gas passage 3 is a passage through which air is supplied to the combustion chambers 2a. An air cleaner 7 for removing foreign matters, such as dust and particles, from the air is disposed in the intake gas passage 3.

The exhaust gas passage 4 is connected to the combustion chambers 2a. The exhaust gas passage 4 is a passage through which exhaust gas flows from the combustion chambers 2a. In the exhaust gas passage 4, an exhaust gas purification catalyst 8 for removing hazardous substances, such as nitrogen oxides (NOx) and ammonia, in exhaust gas is disposed. For example, a three-way catalyst or a Selective Catalytic Reduction (SCR) catalyst is used for the exhaust gas purification catalyst 8.

The main injectors 5 are fuel injection valves of an electromagnetic type, which are configured to inject ammonia gas ($NH_3$ gas) into the combustion chambers 2a. The main injectors 5 are connected to a vaporizing device 12, which will be described later, through an ammonia gas flow passage 9. The main injectors 5 are mounted in the ammonia engine 2.

The main throttle valve 6 is disposed between the air cleaner 7 and the ammonia engine 2 in the intake gas passage 3. The main throttle valve 6 is a flow control valve of an electromagnetic type that is configured to control the flow rate of air to be supplied to the ammonia engine 2.

The engine system 1 further includes an engine cooling system 40 that is configured to cool the ammonia engine 2. The engine cooling system 40 includes a cooling water circulation passage 41 connected to the ammonia engine 2, and a water pump 42 and a radiator 43 that are disposed in the cooling water circulation passage 41.

The cooling water circulation passage 41 is a flow passage through which engine cooling water flows. As the engine cooling water, for example, antifreeze is used. The water pump 42 circulates the engine cooling water in a single direction through the cooling water circulation passage 41. The water pump 42 is directly mounted to the ammonia engine 2. For example, the driving force of the ammonia engine 2 is transmitted to the water pump 42 via a belt to drive the water pump 42.

The radiator 43 releases the heat from hot engine cooling water, which flows from the ammonia engine 2, with vehicle velocity or a cooling fan (not illustrated). The engine cooling water, which has been cooled by the radiator 43, is returned to the ammonia engine 2.

The engine system 1 further includes a reforming system 10 of this embodiment that is configured to reform ammonia gas. The reforming system 10 includes an ammonia tank 11, the vaporizing device 12, a reforming device 13, an air flow passage 14, a reformer throttle valve 15, a reformer injector 16, an electric heater 17, a reformed gas flow passage 18, and a reformed gas cooler 19.

The ammonia tank 11 stores ammonia in a liquid state. That is, the ammonia tank 11 stores liquid ammonia that serves as liquid fuel. The vaporizing device 12 is a vaporizer that is configured to vaporize the liquid ammonia stored in the ammonia tank 11 to produce ammonia gas. The operation of the vaporizing device 12 is described in detail later.

The reforming device 13 is a reformer that is configured to reform the ammonia gas to produce a reformed gas containing hydrogen. The reforming device 13 includes a carrier 13a having, for example, a honeycomb structure. The carrier 13a is coated with a reformer catalyst 13b for decomposing ammonia gas into hydrogen. The reformer catalyst 13b has a function that burns ammonia gas, in addition to the function that decomposes ammonia gas into hydrogen. The reformer catalyst 13b is an Autothermal Reformer (ATR) type ammonia reforming catalyst. As the reformer catalyst 13b, a low-temperature reaction catalyst may be adopted.

The air flow passage 14 connects the intake gas passage 3 with the reforming device 13. Specifically, the air flow passage 14 branches off from the intake gas passage 3 such that one end of the air flow passage 14 is connected to a part of the intake gas passage 3 between the air cleaner 7 and the main throttle valve 6. The other end of the air flow passage 14 is connected to the reforming device 13. The air flow passage 14 is a passage through which air is supplied to the reforming device 13.

The reformer throttle valve 15 is disposed in the air flow passage 14. The reformer throttle valve 15 is a flow control valve of an electromagnetic type, which is configured to control the flow rate of air to be supplied to the reforming device 13. The air flow passage 14 and the reformer throttle valve 15 cooperate to form an air supplier 21 configured to supply air to the reforming device 13.

The reformer injector 16 is connected to the vaporizing device 12 through the ammonia gas flow passage 9. The ammonia gas flow passage 9 is a passage through which the ammonia gas produced by the vaporizing device 12 flows. The reformer injector 16 is a fuel injection valve of an electromagnetic type, which is configured to inject ammonia gas toward the reforming device 13. Specifically, the reformer injector 16 injects ammonia gas into the air flow passage 14 between the reformer throttle valve 15 and the reforming device 13. Accordingly, the air and the ammonia gas flow through the air flow passage 14 between the reformer throttle valve 15 and the reforming device 13.

The ammonia gas flow passage 9, the main injectors 5, the reformer injector 16, and the air flow passage 14 cooperate to form an ammonia gas supplier 22 (a fuel gas supplier) that supplies ammonia gas to the ammonia engine 2 and the reforming device 13.

In the ammonia gas flow passage 9, a pressure reducing valve 23 is disposed. The pressure reducing valve 23 reduces the pressure of ammonia gas to be supplied to the ammonia engine 2 and the reforming device 13. The pressure reducing valve 23 maintains the pressure of ammonia gas to be supplied to the ammonia engine 2 and the reforming device 13 at a predetermined pressure.

The electric heater 17 is a heater that is configured to heat ammonia gas to be supplied to the reforming device 13 to increase the temperature of the reforming device 13 with the ammonia gas. The electric heater 17 includes a heating element 24 disposed in the air flow passage 14 and a power supply 25 for supplying power to the heating element 24. The heating element 24 has, for example, a honeycomb structure. The heat of ammonia gas heated by the electric heater 17 is transferred to the reforming device 13, so that the temperature of the reforming device 13 increases.

The reformed gas flow passage 18 connects the reforming device 13 with the intake gas passage 3. Specifically, one end of the reformed gas flow passage 18 is connected to the reforming device 13. The reformed gas flow passage 18 branches off from the intake gas passage 3 such that the other end of the reformed gas flow passage 18 is connected to a part of the intake gas passage 3 between the main throttle valve 6 and the ammonia engine 2. The reformed gas flow passage 18 is a passage through which the reformed gas produced by the reforming device 13 flows toward the ammonia engine 2.

The reformed gas cooler 19 is disposed in the reformed gas flow passage 18. The reformed gas cooler 19 is a cooler that is configured to cool the reformed gas to be supplied to the ammonia engine 2. The presence of the reformed gas cooler 19 prevents intake system components, such as the main throttle valve 6, from being damaged by heat, and suppresses volume expansion of the reformed gas to facilitate sufficient air intake to the combustion chambers 2a of the ammonia engine 2.

Further, the reforming system 10 includes a circulation passage 27, a circulation pump 28, and a temperature adjustment cooler 29. The circulation pump 28 and the temperature adjustment cooler 29 are disposed in the circulation passage 27.

The circulation passage 27 is a passage connecting the vaporizing device 12 with the reformed gas cooler 19, and through which refrigerant circulates through the vaporizing device 12 and the reformed gas cooler 19. As this refrigerant, for example, antifreeze is used as well as the engine cooling water. The circulation pump 28 circulates the refrigerant in a single direction through the circulation passage 27. The refrigerant may circulate in any direction. The circulation pump 28 is always running, for example.

The temperature adjustment cooler 29 is a temperature adjuster that is configured to adjust the temperature of the refrigerant that flows through the circulation passage 27. The temperature adjustment cooler 29 cools the refrigerant that flows through the circulation passage 27 to adjust the temperature of the refrigerant. The temperature adjustment cooler 29 is, for example, another radiator, which is not the radiator 43 of the engine cooling system 40. The temperature adjustment cooler 29 may include a cooling fan in addition to the radiator. The radiator releases the heat from the refrigerant with vehicle velocity or the cooling fan. The temperature adjustment cooler 29 is not limited to this configuration, and may include a Peltier device.

The refrigerant circulates in a single direction through the circulation passage 27 while the circulation pump 28 is running. Accordingly, the vaporizing device 12 produces ammonia gas, and the reformed gas cooler 19 cools the reformed gas.

Specifically, the refrigerant at high-temperature is introduced to the vaporizing device 12 through the circulation passage 27, and the heat of the refrigerant is transferred to the liquid ammonia in the vaporizing device 12 by heat exchange. This causes the liquid ammonia to be vaporized to produce ammonia gas, and decreases the temperature of the refrigerant. The refrigerant of which the temperature has been decreased is further cooled by the temperature adjustment cooler 29.

The refrigerant at low-temperature, which has been cooled by the temperature adjustment cooler 29, is then introduced to the reformed gas cooler 19 through the circulation passage 27, and receives the heat of the reformed gas at high-temperature by heat exchange in the reformed gas cooler 19. This cools the reformed gas at high-temperature and increases the temperature of the refrigerant. The refrigerant of which the temperature has been increased is introduced into the vaporizing device 12 through the circulation passage 27.

The engine system 1 further includes a temperature sensor 31, an ignition switch 32 (an IG switch), a starter motor 33, and a controller 34.

The temperature sensor 31 is a sensor that is configured to detect the temperature of the reforming device 13. The temperature sensor 31 detects, for example, the temperature of the upstream end of the reformer catalyst 13b of the reforming device 13. The ignition switch 32 is a manually operated switch for a driver of a vehicle to instruct a start and a stop of the ammonia engine 2. The starter motor 33 is a motor that is configured to start the ammonia engine 2.

The controller 34 is formed of components, such as a CPU, a RAM, a ROM, and an input-output interface. The controller 34 is configured to control the main injectors 5, the main throttle valve 6, the reformer throttle valve 15, the reformer injector 16, the electric heater 17, the water pump 42, the circulation pump 28, and the starter motor 33 based on an operation signal of the ignition switch 32 and a detection value detected by the temperature sensor 31.

Figure 2:
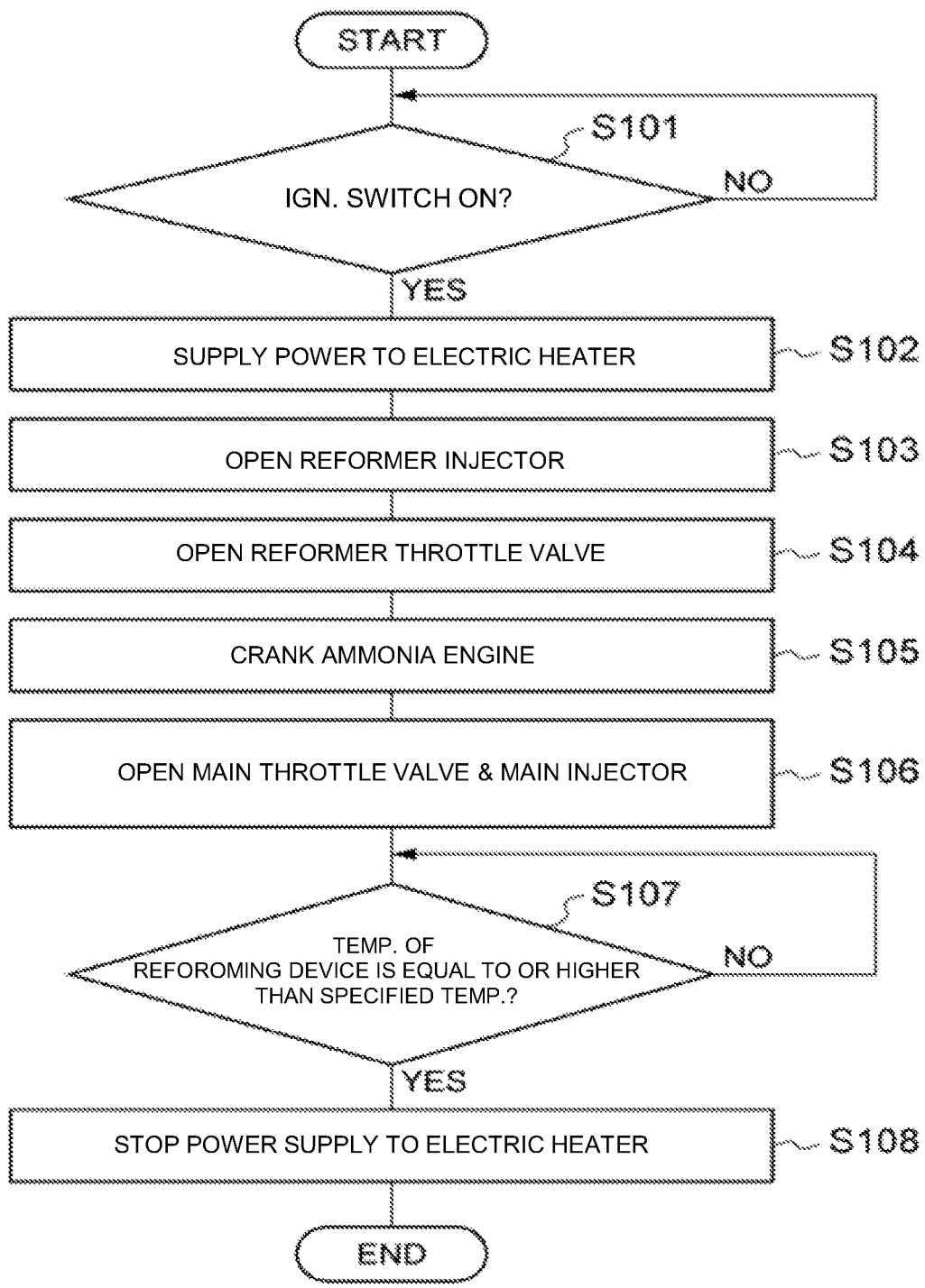
FIG. 2 is a flow chart showing details of a control process executed by a controller shown in FIG. 1.

FIG. 2 is a flow chart showing details of the control process executed by the controller 34. This process is executed at a start of the ammonia engine 2. Before this process is executed, the main injectors 5, the main throttle valve 6, the reformer throttle valve 15, and the reformer injector 16 are in a closed state.

In FIG. 2, the controller 34 determines whether or not the ignition switch 32 is turned ON based on an operation signal from the ignition switch 32 (Step S101). When the controller 34 determines that the ignition switch 32 is turned ON, the controller 34 controls the power supply 25 so that the power supply 25 supplies power to the heating element 24 of the electric heater 17 (Step S102). This allows the heating element 24 to generate heat.

The controller 34 controls the reformer injector 16 so that the reformer injector 16 is opened (Step S103). The reformer injector 16 injects ammonia gas so that the ammonia gas is supplied to the reforming device 13. The ammonia gas is heated by the heating element 24, so that the heat of the ammonia gas increases the temperature of the reforming device 13. Sequentially, the controller 34 controls the reformer throttle valve 15 so that the reformer throttle valve 15 is opened (Step S104). Thus, air is supplied to the reforming device 13.

Subsequently, the controller 34 controls the starter motor 33 so that the starter motor 33 cranks the ammonia engine 2 (Step S105). This starts the ammonia engine 2.

Sequentially, the controller 34 controls the main throttle valve 6 and the main injectors 5 so that the main throttle valve 6 and the main injectors 5 are opened (Step S106). Thus, air is supplied to the ammonia engine 2, and ammonia gas is injected from the main injectors 5 into the ammonia engine 2.

Subsequently, the controller 34 determines whether or not the temperature of the reforming device 13 is equal to or higher than a specified temperature based on the detection value of the temperature sensor 31 (Step S107). The specified temperature is a temperature at which ammonia gas can burn, and is, for example, about 200° C. When the controller 34 determines that the temperature of the reforming device 13 is equal to or higher than the specified temperature, the controller 34 controls the power supply 25 so that the power supply 25 stops the supply of power to the heating element 24 (Step S108).

The control process executed by the controller 34 is not limited to the process shown in the flow chart. For example, Step S105 may be executed after Step S107.

In the engine system 1 described above, when the ignition switch 32 is turned ON in a state where refrigerant is circulated by the circulation pump 28 through the circulation passage 27, power is supplied to the heating element 24 of the electric heater 17 so that the heating element 24 generates heat.

Subsequently, the reformer injector 16 is opened to inject ammonia gas so that the ammonia gas produced by the vaporizing device 12 is supplied to the reforming device 13. The heat of the ammonia gas heated by the heat of the heating element 24 is transferred to the reforming device 13, so that the temperature of the reforming device 13 increases. The reformer throttle valve 15 is then opened, so that air is supplied to the reforming device 13.

Then, the starter motor 33 starts the ammonia engine 2. The activated ammonia engine 2 activates the water pump 42. Thus, the main throttle valve 6 and the main injectors 5 are opened to supply ammonia gas injected by the main injectors 5 to the combustion chambers 2a of the ammonia engine 2, while supplying air to the combustion chambers 2a of the ammonia engine 2. Accordingly, the ammonia gas burns in the combustion chambers 2a.

Although the supply of power to the heating element 24 is stopped when the temperature of the reforming device 13 reaches the specified temperature, the reformer catalyst 13b of the reforming device 13 ignites and burns the ammonia gas, so that the combustion heat generated thereby further increases the temperature of the reforming device 13. Specifically, as shown in the formula below, chemical reaction (oxidation reaction) of part of ammonia and oxygen in the air causes combustion reaction of ammonia, thereby generating combustion heat.

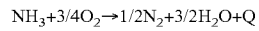

$$NH_3 + 3/4 O_2 \rightarrow 1/2 N_2 + 3/2 H_2O + Q$$

When the temperature of the reforming device 13 reaches the temperature at which reforming of ammonia gas is possible (for example, about 300° C. to 400° C.), the reformer catalyst 13b of the reforming device 13 starts reforming of ammonia gas, which produces the reformed gas at high-temperature containing hydrogen. Specifically, as shown in the formula below, the combustion heat of ammonia causes the reforming reaction in which ammonia is decomposed into hydrogen and nitrogen, which produces the reformed gas containing hydrogen and nitrogen.

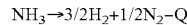

$$NH_3 \rightarrow 3/2 H_2 + 1/2 N_2 - Q$$

The reformed gas is cooled by the reformed gas cooler 19 and then supplied to the combustion chambers 2a of the ammonia engine 2. Thus, in the combustion chambers 2a, the ammonia gas burns together with hydrogen in the reformed gas. Accordingly, the engine system 1 enters normal operation after warming up of the reforming device 13 is completed.

In this embodiment, the circulation pump 28 circulates the refrigerant through the circulation passage 27. The refrigerant at high-temperature is supplied to the vaporizing device 12 so that the liquid ammonia is vaporized by heat exchange with the refrigerant at high temperature in the vaporizing device 12, which produces ammonia gas and decreases the temperature of the refrigerant. The refrigerant at low-temperature is supplied to the reformed gas cooler 19 so that the reformed gas is cooled by heat exchange in the reformed gas cooler 19, which increases the temperature of the refrigerant. The refrigerant at high-temperature is supplied again to the vaporizing device 12. In such a way, this simple system including the circulation passage 27 and the circulation pump 28 enables heat exchange in the vaporizing device 12 and the reformed gas cooler 19. This eliminates the need for a significant modification of the engine cooling system 40, thereby lowering the cost. Further, the vaporizing device 12 and the reformed gas cooler 19 are directly connected via the circulation passage 27, so that heat exchange in the vaporizing device 12 and the reformed gas cooler 19 can be efficiently performed. This allows reduction of fuel consumption.

Further, in this embodiment, even if the amount of increase in the temperature of the refrigerant in the reformed gas cooler 19 is different from the amount of decrease in the temperature of the refrigerant in the vaporizing device 12, more specifically, even if the amount of increase in the temperature of the refrigerant in the reformed gas cooler 19 is greater than the amount of decrease in the temperature of the refrigerant in the vaporizing device 12, the refrigerant that flows through the circulation passage 27 can be maintained at a constant temperature by the temperature adjustment cooler 29.

Figure 3:
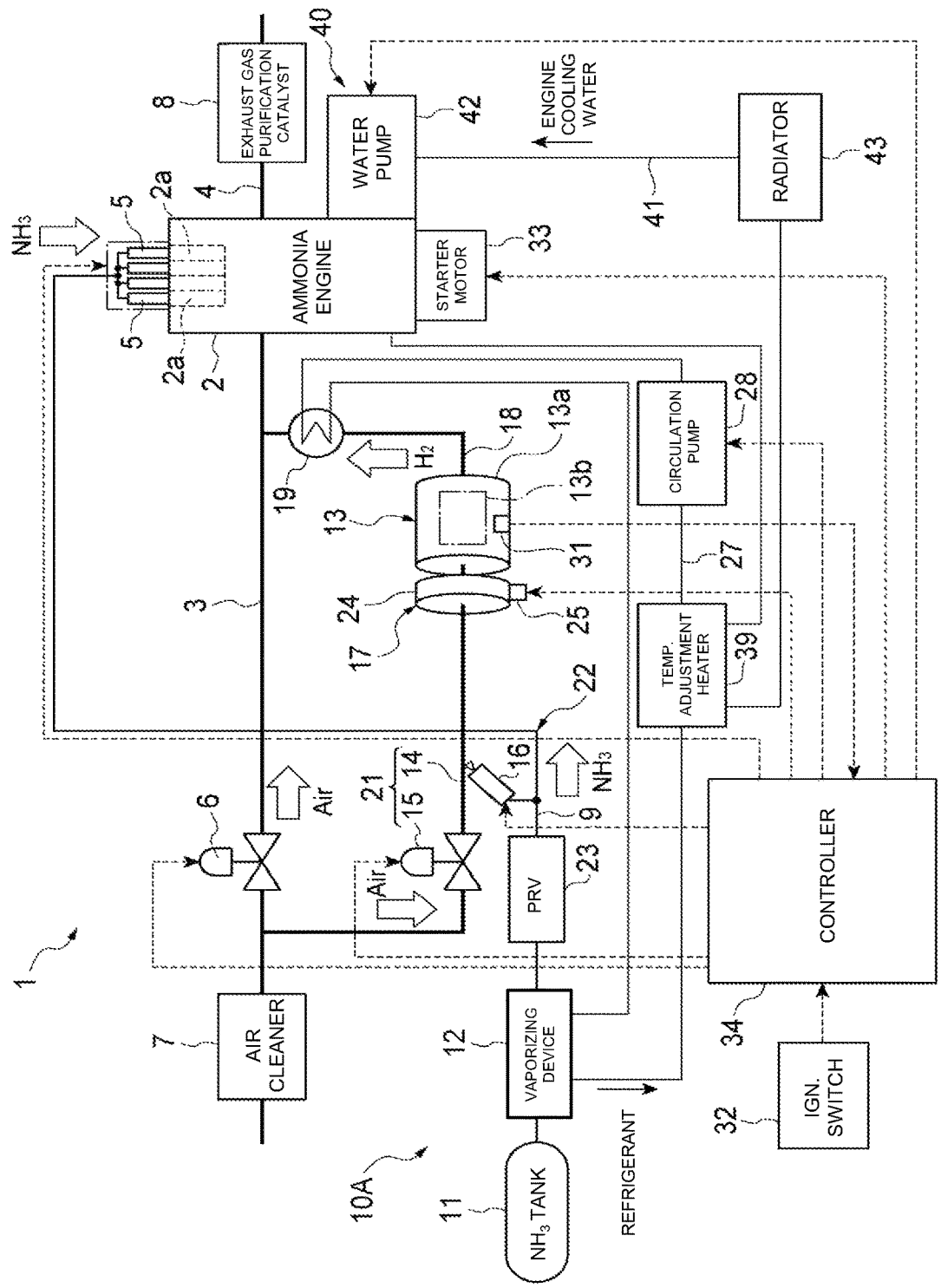
FIG. 3 is a schematic configuration view, illustrating an engine system including a reforming system according to another embodiment of the present invention.

FIG. 3 is a schematic configuration view, illustrating an engine system including a reforming system according to another embodiment of the present invention. In FIG. 3, a reforming system 10A of this embodiment includes a temperature adjustment heater 39 instead of the temperature adjustment cooler 29 of the above-described embodiment. The temperature adjustment heater 39 is a temperature adjuster that is configured to adjust the temperature of refrigerant that flows through the circulation passage 27. The temperature adjustment heater 39 heats the refrigerant that flows through the circulation passage 27 to adjust the temperature of the refrigerant.

The temperature adjustment heater 39 is connected to a part of the cooling water circulation passage 41 of the engine cooling system 40 between the ammonia engine 2 and the radiator 43. The temperature adjustment heater 39 heats the refrigerant that flows through the circulation passage 27 by heat exchange with hot the engine cooling water that flows from the ammonia engine 2. The temperature adjustment heater 39 is not limited to this configuration, and may be an electric heater.

The refrigerant at high-temperature is introduced to the vaporizing device 12 through the circulation passage 27, and the heat of the refrigerant is transferred to the liquid ammonia by heat exchange in the vaporizing device 12. This causes the liquid ammonia to be vaporized to produce ammonia gas, and decreases the temperature of the refrigerant. The refrigerant of which the temperature has been decreased is heated by the temperature adjustment heater 39.

The refrigerant at low-temperature, which has been heated by the temperature adjustment heater 39, is introduced to the reformed gas cooler 19 through the circulation passage 27, and receives the heat of the reformed gas at high-temperature by heat exchange in the reformed gas cooler 19. This cools the reformed gas at high-temperature and increases the temperature of the refrigerant. The refrigerant of which the temperature has been increased is introduced into the vaporizing device 12 through the circulation passage 27.

In this embodiment, even if the amount of decrease in the temperature of the refrigerant in the vaporizing device 12 is greater than the amount of increase in the temperature of the refrigerant in the reformed gas cooler 19, the refrigerant that flows through the circulation passage 27 can be maintained at a constant temperature by the temperature adjustment heater 39.

The present invention is not limited to the above-described embodiments. For example, the temperature adjustment cooler 29 or the temperature adjustment heater 39 for adjusting the temperature of the refrigerant that flows through the circulation passage 27 is provided in the above-described embodiments, but it is not specifically limited thereto. For example, such a temperature adjuster is not necessary if the refrigerant temperature decreasing operation by the vaporizing device 12 is matched with the refrigerant temperature increasing operation by the reformed gas cooler 19 so that the amount of decrease in the temperature of the refrigerant in the vaporizing device 12 is substantially equal to the amount of increase in the temperature of the refrigerant in the reformed gas cooler 19.

In the above-described embodiments, the electric heater 17 heats ammonia gas to be supplied to the reforming device 13 to increase the temperature of the reforming device 13 with the ammonia gas, but it is not specifically limited thereto. The electric heater 17 may directly heat the reforming device 13 to directly increase the temperature of the reforming device 13. Instead, a combustion-type heater configured to burn ammonia for heating may be used.

Further, the vaporizing device 12 may be heated by a device, such as an electric heater, at a start of the ammonia engine 2. In this case, the electric heater or the like is activated to heat the vaporizing device 12 when the ignition switch 32 is turned ON. Heating the vaporizing device 12 enables sufficient heat supply to the vaporizing device 12 for vaporization of liquid ammonia.

Although the temperature of the reforming device 13 is detected by the temperature sensor 31 in the above-described embodiments, it is not specifically limited thereto, and the temperature of the reforming device 13 may be estimated based on conditions, such as the flow rate of ammonia gas, the flow rate of air, time, and room temperature.

Further, although the air flow passage 14 through which air is supplied to the reforming device 13 branches off from the intake gas passage 3 in the above-described embodiments, it is not specifically limited thereto, and air may be supplied to the air flow passage 14 through a passage that is different from the intake gas passage 3 connected to the ammonia engine 2. This can prevent an influence of pulsation in the intake gas passage 3.

Further, the plurality of main injectors 5 for injecting ammonia gas into the corresponding combustion chambers 2a of the ammonia engine 2 are mounted in the ammonia engine 2 in the above-described embodiments, but a single main injector 5 may be provided. In this case, the main injector 5 may be disposed so as to inject ammonia gas in a part of the intake gas passage 3 between the main throttle valve 6 and the ammonia engine 2.

Further, although the ammonia gas supplier 22 includes the reformer injector 16 that is configured to inject ammonia gas toward the reforming device 13 in the above-described embodiments, it is not specifically limited thereto and may include, for example, a flow control valve, instead of the reformer injector 16. In this case, the other end of the ammonia gas flow passage 9 is connected to the air flow passage 14 and the flow control valve is disposed in the ammonia gas flow passage 9. The use of the flow control valve permits supplying ammonia gas continuously to the reforming device 13.

Further, although the other end of the reformed gas flow passage 18 is connected to the intake gas passage 3 in the above-described embodiments, it is not specifically limited thereto, and an injector for injecting reformed gas toward the ammonia engine 2 or the intake gas passage 3 may be provided on the other end of the reformed gas flow passage 18, for example.

Although ammonia is used as a fuel supplied to the ammonia engine 2 and the reforming device 13 in the above-described embodiments, the fuel is not specifically limited to ammonia and may be a substance such alcoholic substance including ethanol.

Although the reforming system of the above-described embodiments is included in an engine system, the present invention is not specifically limited to the engine system, and may be applicable to a system, such as a turbine system or a fuel cell system.

REFERENCE SIGNS LIST 1 engine system
2 ammonia engine (engine)

3 intake gas passage
10, 10A reforming system
12 vaporizing device (vaporizer)
13 reforming device (reformer)
17 electric heater (heater)
18 reformed gas flow passage
19 reformed gas cooler (cooler)
21 air supplier
22 ammonia gas supplier (fuel gas supplier)
27 circulation passage
28 circulation pump
29 temperature adjustment cooler (temperature adjuster)
39 temperature adjustment heater (temperature adjuster)

The invention claimed is:

1. A reforming system comprising:
a vaporizer configured to vaporize liquid fuel to produce fuel gas;
a reformer configured to reform the fuel gas produced by the vaporizer to produce a reformed gas containing hydrogen;
an air supplier configured to supply air to the reformer;
a fuel gas supplier configured to supply the fuel gas to the reformer;
a heater configured to increase a temperature of the reformer;
a reformed gas flow passage through which the reformed gas produced by the reformer flows;
a cooler disposed in the reformed gas flow passage and configured to cool the reformed gas;
a circulation passage connecting the vaporizer with the cooler, and through which refrigerant flows through the vaporizer and the cooler; and
a circulation pump disposed in the circulation passage and configured to circulate the refrigerant through the circulation passage.

2. The reforming system according to claim 1, wherein the reforming system further comprises a temperature adjuster disposed in the circulation passage and configured to adjust a temperature of the refrigerant that flows through the circulation passage.

3. The reforming system according to claim 2, wherein the temperature adjuster cools the refrigerant that flows through the circulation passage to adjust the temperature of the refrigerant.

4. The reforming system according to claim 2, wherein the temperature adjuster heats the refrigerant that flows through the circulation passage to adjust the temperature of the refrigerant.

5. An engine system comprising:
an engine;
an intake gas passage through which air flows to the engine;
a vaporizer configured to vaporize liquid fuel to produce fuel gas;
a reformer configured to reform the fuel gas produced by the vaporizer to produce a reformed gas containing hydrogen;
an air supplier configured to supply air to the reformer;
a fuel gas supplier configured to supply the fuel gas to the engine and the reformer;
a heater configured to increase a temperature of the reformer;
a reformed gas flow passage through which the reformed gas produced by the reformer flows toward the engine;
a cooler disposed in the reformed gas flow passage and configured to cool the reformed gas;
a circulation passage connecting the vaporizer with the cooler, and through which refrigerant flows through the vaporizer and the cooler; and
a circulation pump disposed in the circulation passage and configured to circulate the refrigerant through the circulation passage.

* * * * *